(12) United States Patent
Sekine et al.

(10) Patent No.: US 11,548,546 B2
(45) Date of Patent: Jan. 10, 2023

(54) BEARING AND STEERING MECHANISM

(71) Applicant: OILES CORPORATION, Tokyo (JP)

(72) Inventors: Toshihiko Sekine, Fujisawa (JP);
Katsunori Saito, Fujisawa (JP);
Hiroyuki Kikuchi, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 241 days.

(21) Appl. No.: 16/635,184

(22) PCT Filed: Jul. 31, 2018

(86) PCT No.: PCT/JP2018/028735
§ 371 (c)(1),
(2) Date: Jan. 30, 2020

(87) PCT Pub. No.: WO2019/026928
PCT Pub. Date: Feb. 7, 2019

(65) Prior Publication Data
US 2020/0346681 A1    Nov. 5, 2020

(30) Foreign Application Priority Data

Aug. 3, 2017 (JP) .............................. JP2017-151134

(51) Int. Cl.
*B62D 3/12* (2006.01)
*F16C 17/02* (2006.01)
(Continued)

(52) U.S. Cl.
CPC .............. *B62D 3/126* (2013.01); *F16C 17/02* (2013.01); *F16C 25/04* (2013.01); *F16C 27/063* (2013.01);
(Continued)

(58) Field of Classification Search
CPC ........ F16C 17/02; F16C 25/04; F16C 27/063; F16C 29/002; F16C 29/02; F16C 2326/24;
(Continued)

(56) References Cited

U.S. PATENT DOCUMENTS 7,665,747 B2 *   2/2010   Arlt .......................... F16C 33/20
                                                                    280/93.514
7,798,504 B2 *   9/2010   Hirose ...................... B62D 3/12
                                                                    280/93.514
(Continued)

FOREIGN PATENT DOCUMENTS

CN      101981349 A      2/2011
CN      102667195 A      9/2012
(Continued)

OTHER PUBLICATIONS

International Search Report for PCT/JP2018/028735 dated Oct. 30, 2018, 3 pages.
(Continued)

*Primary Examiner* — Adam D Rogers
(74) *Attorney, Agent, or Firm* — Nixon & Vanderhye P.C.

(57) ABSTRACT

To reduce the effect of a steering operation on feeling. A rack bush comprises: a bush body that is accommodated in a cylindrical housing, supports a load exerted on a rack bar while allowing the rack bar to move in the direction of an axial center O, and can be extended and retracted in a radial direction; and an elastic ring mounted on the bush body. The bush body has a mounting groove for mounting the elastic ring, the mounting groove being formed peripherally in an outer peripheral surface, and the mounting groove having a large-diameter part where the circumferential radius of a groove bottom is a first radius r1, and a small-diameter part where said radius is a second radius r2 that is less than the first radius r1. This configuration allows the formation of an (Continued)

elastic ring protruding part, in which the elastic ring protrudes greatly from the outer peripheral surface of the bush body, and an elastic ring embedded part, in which the elastic ring is embedded in the outer peripheral surface of the bush body.

6 Claims, 5 Drawing Sheets

(51) Int. Cl.
    *F16C 25/04*     (2006.01)
    *F16C 27/06*     (2006.01)
    *F16C 29/02*     (2006.01)
    *F16C 29/00*     (2006.01)
    *F16H 55/28*     (2006.01)

(52) U.S. Cl.
    CPC ............ *F16C 29/002* (2013.01); *F16C 29/02* (2013.01); *F16C 2326/24* (2013.01); *F16C 2361/61* (2013.01); *F16H 2055/281* (2013.01)

(58) Field of Classification Search
    CPC ....... F16C 2361/61; B62D 3/12; B62D 3/126; B62D 7/226; F16H 2055/281
    See application file for complete search history.

(56) References Cited

U.S. PATENT DOCUMENTS

| | | | | |
|---|---|---|---|---|
| 8,272,785 B2* | 9/2012 | Hirose | .................. | F16C 29/002 384/215 |
| 8,418,583 B2* | 4/2013 | Oki | .......................... | B62D 3/12 74/594 |
| 8,506,169 B2* | 8/2013 | Nakagawa | ........... | B62D 5/0409 384/215 |
| 9,279,450 B2* | 3/2016 | Zaike | ...................... | F16C 33/20 |
| 9,428,216 B2* | 8/2016 | Kawakubo | .............. | F16C 29/02 |
| 9,744,984 B2* | 8/2017 | Oda | ........................ | F16C 33/20 |
| 9,933,014 B2* | 4/2018 | Ikeda | ...................... | F16C 29/02 |
| 9,989,084 B2* | 6/2018 | Nakagawa | .............. | F16C 27/02 |
| 9,995,337 B2* | 6/2018 | Ikeda | ....................... | B62D 1/20 |
| 10,508,685 B2* | 12/2019 | Nakagawa | ............... | B62D 1/16 |
| 11,254,347 B2* | 2/2022 | Ikeyama | ................. | F16C 25/04 |
| 2011/0016997 A1 | 1/2011 | Oki et al. | | |
| 2015/0020618 A1 | 1/2015 | Kawakubo | | |
| 2015/0204381 A1 | 7/2015 | Zaike et al. | | |
| 2016/0059883 A1 | 3/2016 | Mizutani et al. | | |
| 2021/0188341 A1* | 6/2021 | Ikeyama | ................. | F16C 25/04 |

FOREIGN PATENT DOCUMENTS

| | | | | |
|---|---|---|---|---|
| CN | 104326015 A | | 2/2015 | |
| CN | 104806634 A | | 7/2015 | |
| CN | 109131535 A | * | 1/2019 | |
| JP | 2005-178482 | | 7/2005 | |
| JP | 2008-151289 | | 7/2008 | |
| JP | 2015-13562 | | 1/2015 | |
| JP | 2015-137721 | | 7/2015 | |
| WO | WO-2019026850 A1 | * | 2/2019 | .............. B62D 3/12 |
| WO | WO-2020213423 A1 | * | 10/2020 | .............. F16C 35/02 |

OTHER PUBLICATIONS

Written Opinion of the ISA for PCT/JP2018/028735 dated Oct. 30, 2018, 3 pages.
Search Report dated Apr. 2, 2021 issued in Chinese Application No. 201880048476.9 with English translation (5 pages).
Examination Report dated Jul. 23, 2021 issued in Indian Application No. 202047001277 with English translation (6 pages).
Search Report issued in EP Appln. No. 18840701.9 dated Apr. 6, 2021.

* cited by examiner

BEARING AND STEERING MECHANISM

This application is the U.S. national phase of International Application No. PCT/JP2018/028735 filed Jul. 31, 2018 which designated the U.S. and claims priority to JP Application No. 2017-151134 filed Aug. 3, 2017, the entire contents of each of which are hereby incorporated by reference.

TECHNICAL FIELD

The present invention relates to a bearing, and in particular to a bearing suitable for a rack bush used in a rack-and-pinion steering mechanism.

BACKGROUND ART

The Patent Literature 1 describes a rack bush used in a rack-and-pinion steering mechanism. This rack bush is housed in a circular cylindrical housing in a state that movement in the axial direction is restricted, and supports the load applied to a rack bar while allowing movement of the rack bar in the axial direction. The rack bush comprises: a circular cylindrical bearing body, which can be freely expanded and contracted in the radial direction, and into which the rack bar is inserted; and elastic rings, which are mounted on the bearing body and bias the bearing body inward in the radial direction. The bearing body is made of synthetic resin, and mounting grooves for mounting the elastic rings are formed in the outer peripheral surface of the bearing body, each in the circumferential direction.

According to this rack bush, the bearing body is contracted in diameter by the elastic rings so that the rack bar inserted in the bearing body is tightened. As a result, the clearance between the inner peripheral surface of the bearing body and the outer peripheral surface of the rack bar is made to be zero, and thus it is possible to prevent generation of unpleasant sound owing to collision between the inner peripheral surface of the bearing body and the outer peripheral surface of the rack bar. Further, it is possible to prevent variation in the friction torque caused by a dimension error of the outer diameter of the rack bar.

CITATION LIST

Patent Literature

Patent Literature 1: Japanese Unexamined Patent Application Laid-Open No. 2008-151289

SUMMARY OF INVENTION

Technical Problem

When a steering shaft is rotated by steering operation in a rack-and-pinion steering mechanism, the rotational movement of the steering shaft is converted into the linear movement of the rack bar owing to engagement between a pinion gear formed in the end portion of the steering shaft and a rack gear formed in the rack bar. As a result, tie rods interlocked with the rack bar give torque for rotating tires around their kingpins to steering knuckles via the tie rod ends. At that time, reaction force from the tires is inputted into the rack bar via the steering knuckles, the tie rod ends, and the tie rods.

Here, since the rack bush described in the Patent Literature 1 is housed in the housing with the elastic rings mounted on the bearing body being abutted against the inner peripheral surface of the housing, the elastic rings are compressively deformed and moved within the housing owing to the reaction force from the tires inputted into the rack bar. Accordingly, the time lag from the steering operation to actual change of the directions of the tires becomes larger, and this affects feeling of steering operation unfavorably.

The present invention has been made taking the above conditions into consideration, and an object of the invention is to provide a bearing suitable for a rack bush that can reduce a bad effect on the feeling of steering operation.

Solution to Problem

To solve the above problems, according to the present invention, a mounting groove for mounting an elastic ring is formed in the circumferential direction in the outer peripheral surface of a bush body through which a rack bar is inserted, so as to be provided with a large-diameter part where the groove bottom in the circumferential direction has a first radius and a small-diameter part where the groove bottom in the circumferential direction has a second radius smaller than the first radius. Here, it is favorable that a sum of the first radius and the wire diameter of the elastic body forming the elastic ring is larger than the radius of the outer peripheral surface of the bush body while a sum of the second radius and the wire diameter of the elastic body forming the elastic ring is smaller than or equal to the radius of the outer peripheral surface of the bush body.

For example, the present invention provides a bearing, comprising:

a bush body which can be freely expanded and contracted in a radial direction; and an elastic ring mounted on the bush body;

wherein:

the bush body has a mounting groove formed in an outer peripheral surface in a circumferential direction for mounting the elastic ring; and the mounting groove has:

a large-diameter part where a groove bottom in a circumferential direction of the mounting groove has a first radius; and a small-diameter part where the groove bottom in the circumferential direction has a second radius smaller than the first radius.

Further, the present invention provides a rack-and-pinion steering mechanism, comprising:

the above-mentioned bearing, which supports a load applied to a rack bar while allowing movement of the rack bar in an axial direction; and a cylindrical housing, which houses the bearing while restricting movement of the bearing in the axial direction;

wherein, the bearing is housed in the housing so that the small-diameter part of the mounting groove faces a reaction force supporting surface which is an inner peripheral surface of the housing opposed to an input direction of a reaction force inputted to the rack bar from a tire via a tie rod linked to the rack bar.

Advantageous Effects of Invention

According to the present invention, the mounting groove for mounting the elastic ring has the large-diameter part where the groove bottom in the circumferential direction has a first radius and a small diameter part where the groove bottom in the circumferential direction has a second radius smaller than the first radius. As a result, there are formed an elastic ring protruding part where the elastic ring protrudes largely from the outer peripheral surface of the bush body and an elastic ring embedded part where the elastic ring is embedded in or protrudes small from the outer peripheral part of the bush body. By mounting the rack bush in the housing so that the elastic ring embedded part is opposed to the reaction force supporting surface, which is the inner peripheral surface of the housing in opposition to the input direction of reaction force inputted to the rack bar from a tire via a tie rod, it is possible to reduce the gap between the outer peripheral surface of the bush body and the reaction force supporting surface. Accordingly, the rigidity against reaction force of tire is improved, and movement of the rack bar within the housing owing to the reaction force of tire can be restricted, and therefore the time lag from steering operation to actual change of the tire direction is reduced. Further, in the present invention, since it is not necessary to shorten the circumference of the elastic ring on the inner peripheral side to strengthen tightening of the rack bar for improvement of the rigidity against reaction force of tire, the sliding characteristics of the rack bush are not affected. Thus, the present invention can provide a rack bush that can reduce the effect on the feeling of steering operation.

DESCRIPTION OF EMBODIMENTS

Figure 1:
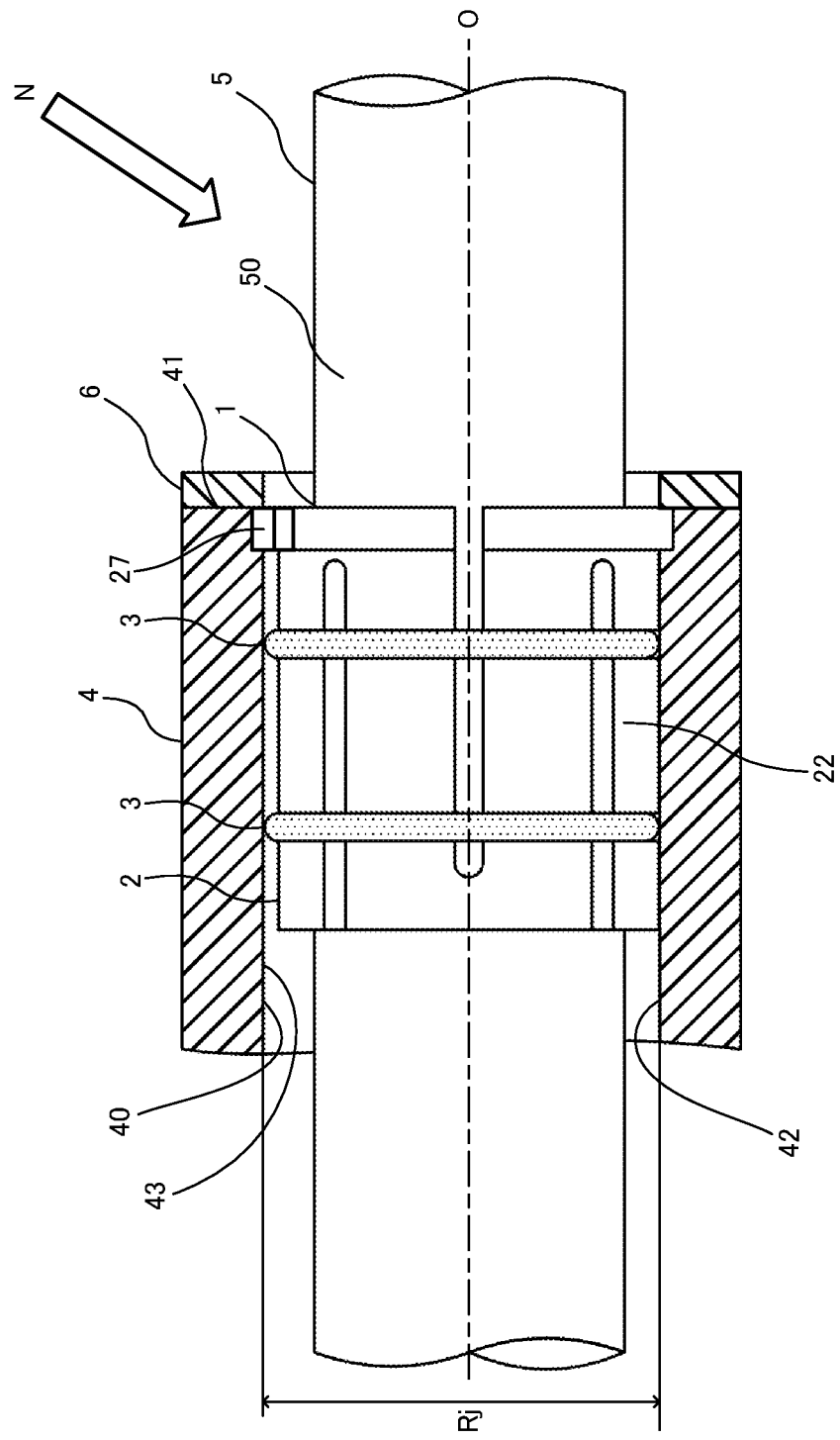
FIG. 1 is a partial cross-section view of a part of a rack-and-pinion steering mechanism according to one embodiment of the present invention.

In the following, one embodiment of the present invention will be described referring to the drawings.

FIG. 1 is a partial cross-section view of a part of a rack-and-pinion steering mechanism according to the present embodiment.

As shown in the figure, the rack-and-pinion steering mechanism of the present embodiment comprises: a rack bush 1, which supports a load applied to a rack bar 5 while allowing movement of the rack bar 5 in the direction of the axis O; and a cylindrical housing 4, which houses the rack bush 1 while restricting movement of the rack bush 1 in the direction of the axis O.

Figure 2:
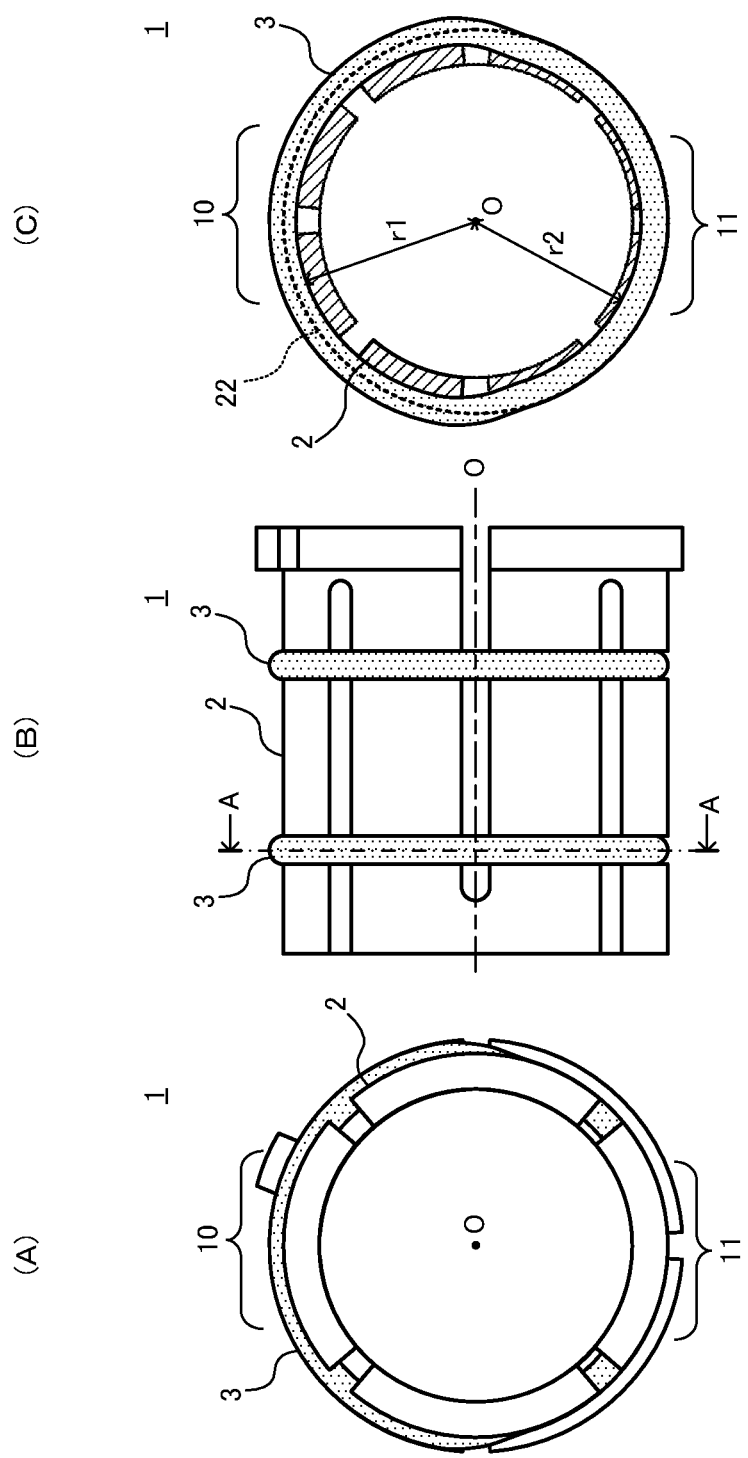
FIGS. 2(A) and 2(B) are respectively a front view and a side view of a rack bush 1.
FIG. 2(C) is an A-A cross-section view of the rack bush 1 shown in FIG. 2(B)

FIGS. 2(A) and 2(B) are respectively a front view and a side view of the rack bush 1, and FIG. 2(C) is an A-A cross-section view of the rack bush 1 shown in FIG. 2(B).

As shown in the figures, the rack bush 1 comprises: a bush body 2 through which the rack bar 5 is inserted; and elastic rings 3 mounted on the bush body 2. Although the present embodiment shows an example in which two elastic rings 3 are mounted on the bush body 2, it is possible that one, three, or more elastic rings 3 are mounted on the bush body 2.

Figure 3:
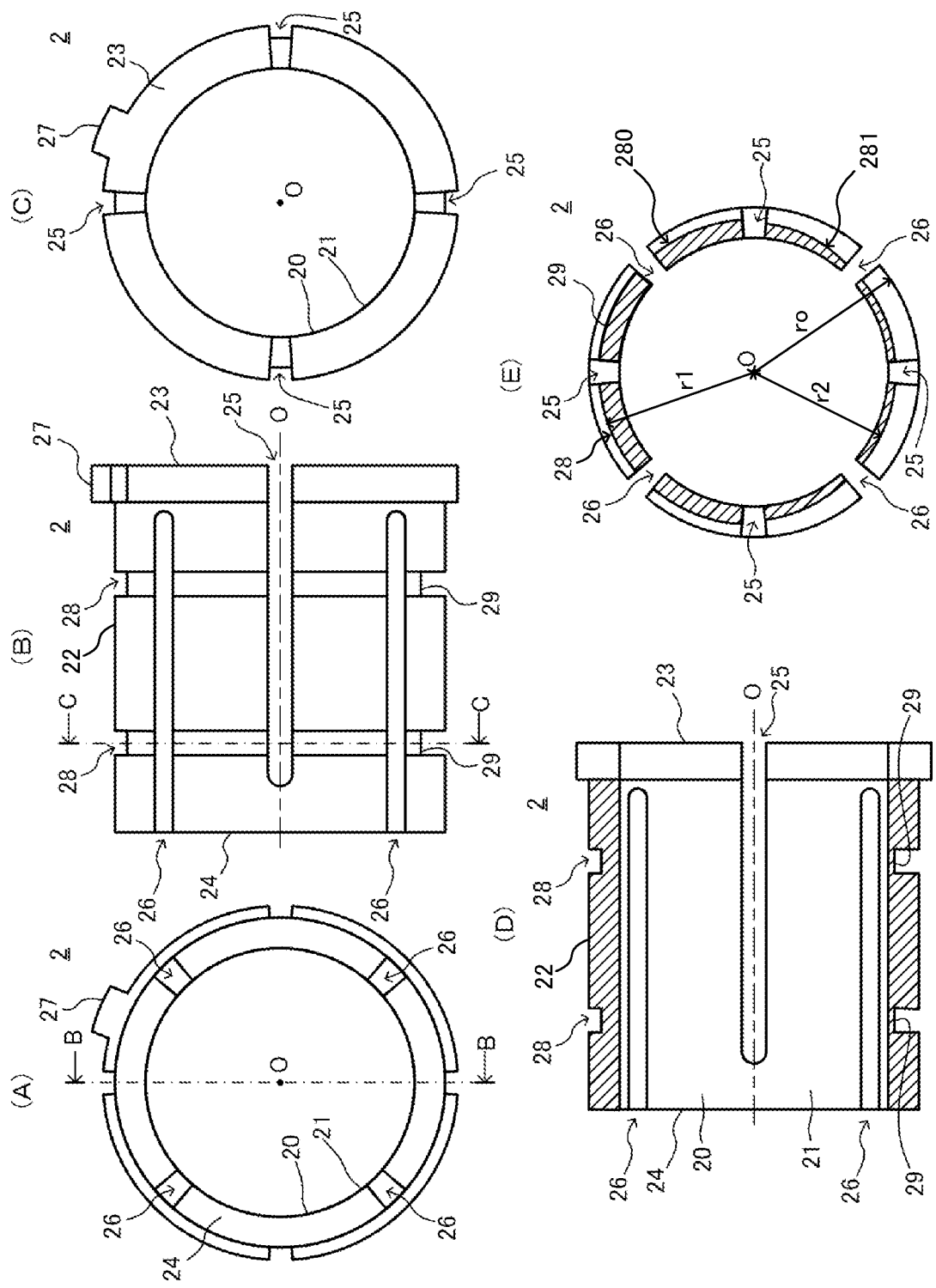
FIGS. 3(A), 3(B), and 3(C) are respectively a front view, a side view, and a back view of a bush body 2.
FIG. 3(D) is a B-B cross-section view of the bush body 2 shown in FIG. 3(A)
FIG. 3(E) is a C-C cross-section view of the bush body 2 shown in FIG. 3(B)

FIGS. 3(A), 3(B), and 3(C) are respectively a front view, a side view, and a back view of the bush body 2, FIG. 3(D) is a B-B cross-section view of the bush body 2 shown in FIG. 3(A), and FIG. 3(E) is a C-C cross-section view of the bush body 2 shown in FIG. 3(B).

The bush body 2 is formed of synthetic resin having good sliding characteristics such as polyacetal resin, polyamide resin, or polyethylene resin, and is a cylindrical member which can be freely expanded and contracted in the radial direction. As shown in the figure, the bush body 2 comprises: a sliding surface 21, which is formed in an inner peripheral surface 20 and comes in sliding contact with an outer peripheral surface 50 of the rack bar 5 inserted; a plurality of first slits 25 and second slits 26, which are arranged alternately in the circumferential direction at regular intervals; an engagement protrusion 27, which is formed on an outer peripheral surface 22; and mounting grooves 28, which are formed in the outer peripheral surface 22 in the circumferential direction in order to mount the elastic rings 3.

The first slits 25 are each formed along the direction of the axis O from one end surface 23 toward the other end surface 24, and the second slits 26 are each formed along the direction of the axis O from the other end surface 24 toward the one end surface 23. The bush body 2 can be deformed in the diameter contracting direction owing to the plurality of first slits 25 and second slits 26 arranged alternately in the circumferential direction at regular intervals.

The engagement protrusion 27 protrudes outward in the radial direction from the outer peripheral surface 22 on the side of the one end surface 23, and is received in an engagement recess (not shown) which is formed to cut off the inner peripheral surface 40 at one end surface 41 of the housing 4. By this arrangement, the rack bush 1 housed in the housing 4 is restricted in rotation around the axis O. Further, a ring-shaped lid 6 is attached to the one end surface 41 of the housing 4 in a state that the engagement protrusion 27 is received in the engagement recess of the housing 4. As a result, the rack bush 1 housed in the housing 4 is restricted in movement in the direction of the axis O (See FIG. 1).

Figure 4:
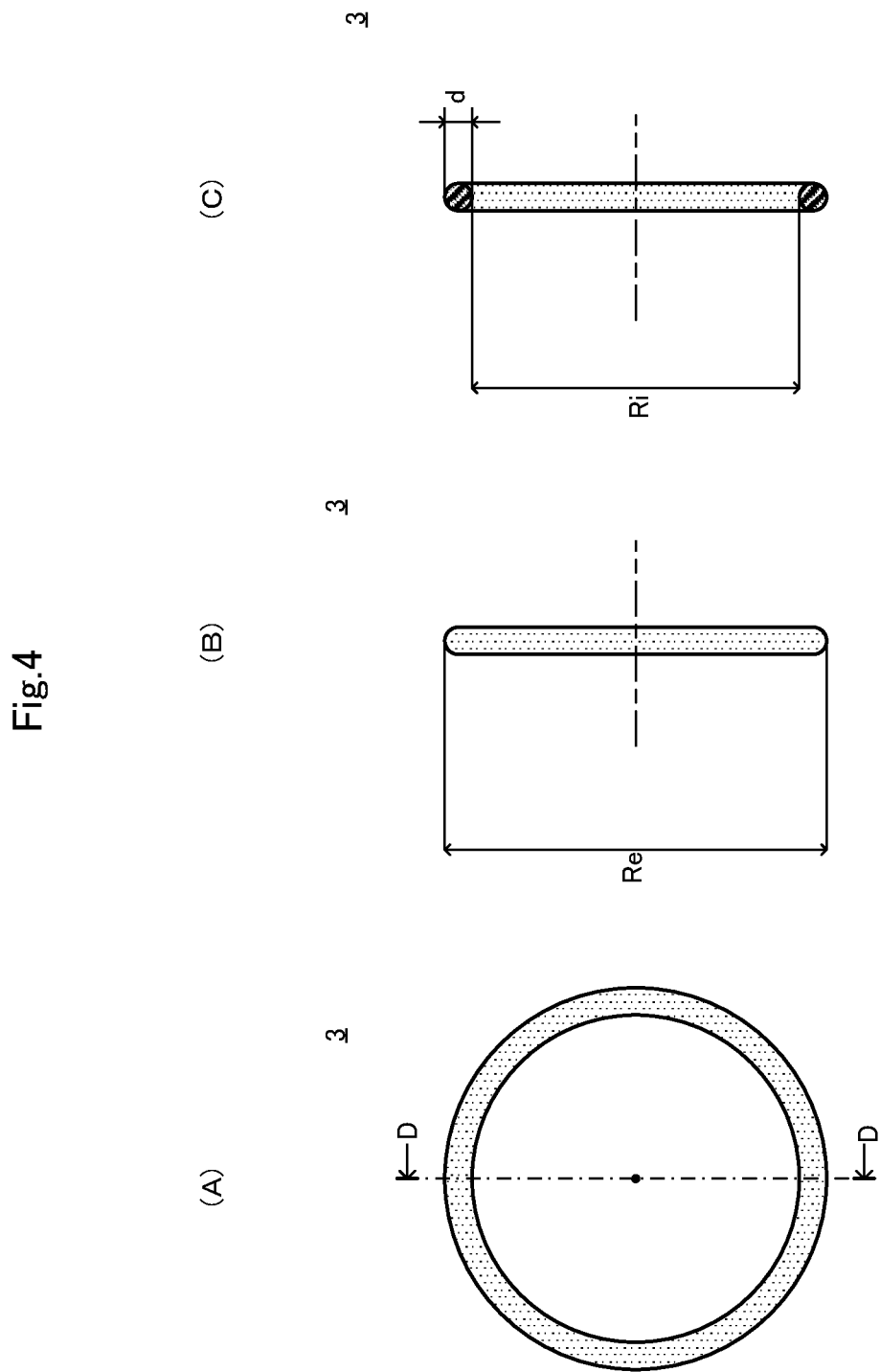
FIGS. 4(A) and 4(B) are respectively a front view and a side view of an elastic ring 3.
FIG. 4(C) is a D-D cross-section view of the elastic ring 3 shown in FIG. 4(A)

Each of the mounting grooves 28 is formed in the outer peripheral surface 22 along the circumferential direction, and has a large-diameter part 280 where the groove bottom 29 in the circumferential direction has a first radius r1 and a small-diameter part 281 where the groove bottom 29 in the circumferential direction has a second radius r2 smaller than the first radius r1. Here, expressing the radius of the outer peripheral surface 22 as r0 and the wire diameter of the elastic body forming the elastic ring 3 as d (See FIG. 4), the first radius r1 is set so that r1+d>r0. On the other hand, the second radius r2 is set so that r2+d<=r0. As a result, in the rack bush 1, there are formed an elastic ring protruding part 10, where the elastic ring 3 protrudes largely from the outer peripheral surface 22 of the bush body 2, and an elastic ring embedded part 11, where the elastic ring 3 is embedded in the outer peripheral surface 22 of the bush body 2 (See FIG. 2).

FIGS. 4(A) and 4(B) are respectively a front view and a side view of each elastic ring 3, and FIG. 4(C) is a D-D cross-section view of the elastic ring 3 shown in FIG. 4(A).

Each elastic ring 3 is an annular member formed of an elastic body such as synthetic resin, thermoplastic elastomer, or the like, and the inner circumference πRi on the side of the inner diameter Ri is shorter than the circumference of the groove bottom 29 of the mounting groove 28 of the bush body 2. Further, the outer diameter Re is larger than the inner diameter Rj of the housing 4 (See FIG. 1).

The circumference πRi of the elastic ring 3 on the side of the inner diameter Ri is shorter than the circumference of the groove bottom 29 of the mounting groove 28 of the bush body 2. Thus, when the elastic ring 3 is mounted in the mounting groove 28 of the bush body 2, the elastic ring 3 biases the bush body 2 in the direction of contracting the diameter of the bush body 2 and tightens the rack bar 5 inserted in the bush body 2. Further, the outer diameter Re of the elastic ring 3 is larger than the inner diameter Rj of the housing 4. Therefore, when the rack bush 1 is housed in the housing 4, the elastic ring 3 comes in pressed contact with the inner peripheral surface 40 of the housing 4, and accordingly is compressively deformed. As a result, the rack bush 1 is fitted in the housing 4.

In FIG. 1, a reaction force supporting surface 42 is the inner peripheral surface 40 of the housing 4 opposed to the input direction of the reaction force N inputted to the rack bar 5 from a tire (not shown) via a tie rod (not shown) linked to the rack bar 5, and is an area including the site that generates the greatest reaction force to the reaction force N inputted to the rack bar 5 in the inner peripheral surface 40 of the housing 4. The rack bush 1 of the above configuration is positioned by the engagement between the engagement protrusion 27 of the bush body 2 and the engagement recess (not shown) of the housing 4 so that the small-diameter parts 281 of the mounting grooves 28 of the bush body 2 are positioned on the side of the reaction force supporting surface 42, or in other words, the elastic ring embedded parts 11 are positioned on the side of the reaction force supporting surface 42.

Hereinabove, one embodiment of the present invention has been described.

In the present embodiment, each of the mounting grooves 28 of the bush body 2 has the large-diameter part 280 where the groove bottom in the circumferential direction has the first radius r1 and the small-diameter part 281 where the groove bottom in the circumferential direction has the second radius r2 smaller than the first radius r1. Accordingly, the rack bush 1 has the elastic protruding parts 10, in each of which the elastic ring 3 protrudes largely from the outer peripheral surface 22 of the bush body 2, and the elastic ring embedded parts 11, in each of which the elastic ring 3 is embedded in the outer peripheral surface 22 of the bush body 2. The rack bush 1 is housed in the housing 4, being positioned so that the elastic ring embedded parts 11 are positioned on the side of the reaction force supporting surface 42.

Accordingly, on the side of the reaction force supporting surface 42 of the housing 4, the outer peripheral surface 22 of the bush body 2 is abutted against the inner peripheral surface 40 of the housing 4 without intervention of the elastic rings 3, and there is no gap between the outer peripheral surface 22 of the bush body 2 and the inner peripheral surface 40 of the housing 4. This improves the rigidity on the side of the reaction force supporting surface 42 and can suppress movement of the rack bar 5 within the housing 4 owing to the reaction force N of a tire. Thereby, the time lag from steering operation to actual change of the tire direction is reduced.

Further, it is not necessary to shorten the circumference of each elastic ring 3 on the side of the inner diameter Ri to tighten more firmly the rack bar 5 in order to improve the rigidity on the reaction force supporting surface 42. Accordingly, the sliding characteristics of the rack bush 1 are not affected.

Thus, the present embodiment can provide the rack bush 1 that reduces the effect on the feeling of steering operation.

Further, in comparison with the conventional rack bush whose mounting grooves have groove bottoms of a constant radius with respect to the circumferential direction (that is to say, groove bottoms each of a perfect circle), it is possible to increase the compressive deformation amount of the elastic body forming each elastic ring 3 on the side of the reaction force supporting surface opposed surface 43 which is the inner peripheral surface 40 of the housing 4 opposed to the reaction force supporting surface 42 across the axis O, and the spring force as the reaction force is applied toward the inner peripheral surface of the rack bush 1. Accordingly, the rigidity is improved not only on the side of the reaction force supporting surface 42 but also on the side of the reaction force supporting surface opposed surface 43, and the effect on the feeling of steering operation can be further reduced.

The present invention is not limited to the above embodiment, and can be varied variously.

For example, in the above embodiment, expressing the radius of the outer peripheral surface 22 of the bush body 2 as r0 and the wire diameter of the elastic body forming each elastic ring 3 as d, the second radius r2 of the groove bottom 29 in the circumferential direction at the small-diameter part 281 of the mounting groove 8 is set so that r2+d<=r0. The present invention, however, is not limited to this.

It is sufficient that the second radius r2 of the groove bottom 29 in the circumferential direction at the small-diameter part 281 of the mounting groove 28 is set so that the elastic ring 3 is embedded in the outer peripheral surface 22 of the bush body 2 at the elastic ring embedded part 11 or the amount of protrusion of the elastic ring 3 from the outer peripheral surface 22 of the bush body 2 is smaller than that at the elastic ring protruding part 10. By this arrangement, the gap between the outer peripheral surface 22 of the bush body 2 and the inner peripheral surface 40 of the housing 4 is made smaller on the side of the reaction force supporting surface 42 of the housing 4, and movement of the rack bar 5 inside the housing 4 owing to the tire's reaction force N is suppressed. Accordingly, the time lag from steering operation to actual change of the tire direction is reduced.

Figure 5:
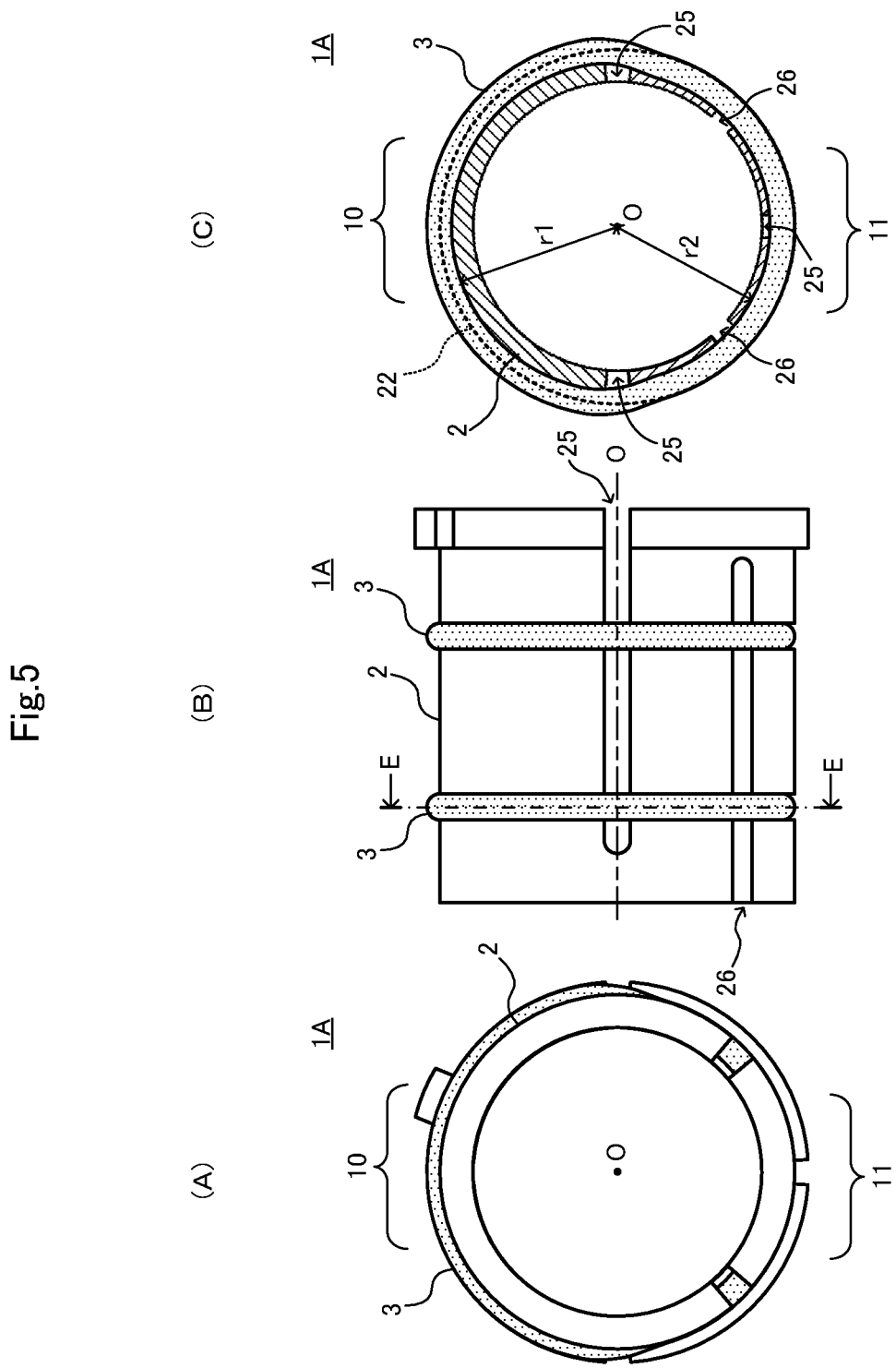
FIGS. 5(A) and 5(B) are respectively a front view and a side view of a variant 1A of the rack bush 1.
FIG. 5(C) is an E-E cross-section view of the variant 1A of the rack bush 1 shown in FIG. 5(B).

Further, in the above embodiment, as shown in a variant 1A of the rack bush 1 shown in FIGS. 5(A)-5(C), the first slits 25 and the second slits 26 can be omitted from the bush body 2 on the side of the elastic ring protruding parts 10 (the large-diameter parts 280 of the mounting grooves 28). In other words, the first slits 25 and the second slits 26 can be arranged only on the side of the elastic ring embedded parts 11 (the small-diameter parts 281 of the mounting grooves 28). By this arrangement, it is possible to avoid escape of the elastically-deformed elastic rings 3 into the first slits 25 and the second slits 26 on the side of the reaction force supporting surface opposed surface 43 and to increase furthermore the compressive deformation amount of the elastic body forming each elastic ring 3. Thereby, the reaction force of the elastic rings 3 on the side of the reaction force supporting surface opposed surface 43 becomes larger, and the rigidity on the side of the reaction force supporting surface opposed surface 43 is improved furthermore.

Further, in the above embodiment, a plurality of first slits 25 are formed in the bush body 2 along the direction of the axis O from the one end surface 23 toward the other end surface 24, and a plurality of second slits 26 are formed along the direction of the axis O from the other end surface 24 toward the one end surface 23. The present invention, however, is not limited to this. It is good enough if the bush body 2 can be freely expanded and contracted in radial direction. For example, the bush body 2 may have only the first slits 25 or only the second slits 26. Further, in the above embodiment, the bush body 2 has the cylindrical shape. However, it is good enough if the bush body 2 has a tubular shape adapted to the shape of the rack bar 5 to be inserted.

Further, the above embodiment has been described taking an example of rack bush used in a rack-and-pinion steering mechanism. The present invention is not limited to this, and can be widely applied to a bearing for supporting a load of an inserted axial member.

REFERENCE SIGNS LIST

1, 1A: rack bush; 2: bush body; 3: elastic ring; 4: housing; 5: rack bar; 6: lid; 10: elastic ring protruding part; 11: elastic ring embedded part; 20: inner peripheral surface of the bush body 2; 21: sliding surface of the bush body 2; 22: outer peripheral surface of the bush body 2; 23, 24: end surface of the bush body 2; 25: first slit; 26: second slit; 27: engagement part; 28: mounting groove; 29: groove bottom of the mounting groove 28; 40: inner peripheral surface of the housing 4; 41: end surface of the housing 4; 42: reaction force supporting surface of the housing 4; 43: reaction force supporting surface opposed surface of the housing 4; 280: large-diameter part of the mounting groove 28; and 281: small-diameter part of the mounting groove.

The invention claimed is:

1. A bearing comprising:
a bush body with a central longitudinal axis, the bush body comprising:
a mounting groove formed in an outer peripheral surface of the bush body and extending in a circumferential direction of the bush body, the mounting groove having a large-diameter part and a small-diameter part, a groove bottom of the mounting groove in the large-diameter part having a first radius of curvature originating at the central longitudinal axis of the bush body, the groove bottom of the mounting groove in the small-diameter part having a second radius of curvature originating at the central longitudinal axis of the bush body, the second radius of curvature being smaller than the first radius of curvature, the mounting groove being deeper in the small-diameter part than in the large-diameter part,
slits formed from one end surface toward another end surface of the bush body and thereby allowing the bush body to be freely expanded and contracted in a radial direction of the bush body, the slits all being arranged to intersect the small-diameter part of the mounting groove; and
an elastic ring mounted in the mounting groove of the bush body.

2. A rack-and-pinion steering mechanism, comprising:
a bearing of claim 1, which supports a load applied to a rack bar while allowing movement of the rack bar in an axial direction; and
a cylindrical housing, which houses the bearing while restricting movement of the bearing in the axial direction,
wherein, the bearing is housed in the housing so that the small-diameter part of the mounting groove faces a reaction force supporting surface which is an inner peripheral surface of the housing opposed to an input direction of a reaction force inputted to the rack bar from a tire via a tie rod linked to the rack bar.

3. A bearing of claim 1, wherein:
an amount of protrusion of the elastic ring from the large-diameter part is larger than an amount of protrusion from the small-diameter part.

4. A rack-and-pinion steering mechanism, comprising:
a bearing of claim 3, which supports a load applied to a rack bar while allowing movement of the rack bar in an axial direction; and
a cylindrical housing, which houses the bearing while restricting movement of the bearing in the axial direction,
wherein, the bearing is housed in the housing so that the small-diameter part of the mounting groove faces a reaction force supporting surface which is an inner peripheral surface of the housing opposed to an input direction of a reaction force inputted to the rack bar from a tire via a tie rod linked to the rack bar.

5. A bearing of claim 1, wherein:
a sum of the first radius and a wire diameter of an elastic body forming the elastic ring is larger than a radius of the outer peripheral surface of the bush body, and
a sum of the second radius and the wire diameter of the elastic body forming the elastic ring is smaller than or equal to the radius of the outer peripheral surface of the bush body.

6. A rack-and-pinion steering mechanism, comprising:
a bearing of claim 5, which supports a load applied to a rack bar while allowing movement of the rack bar in an axial direction; and
a cylindrical housing, which houses the bearing while restricting movement of the bearing in the axial direction,
wherein, the bearing is housed in the housing so that the small-diameter part of the mounting groove faces a reaction force supporting surface which is an inner peripheral surface of the housing opposed to an input direction of a reaction force inputted to the rack bar from a tire via a tie rod linked to the rack bar.

* * * * *